(12) United States Patent
Rudorf et al.

(10) Patent No.: US 11,262,031 B2
(45) Date of Patent: Mar. 1, 2022

(54) CABLE HAVING A LIGHT-EMITTING ELEMENT

(71) Applicant: LEONI KABEL GMBH, Roth (DE)

(72) Inventors: Uwe Rudorf, Ahrensfelde (DE); Maik Stratmann, Friesoythe (DE)

(73) Assignee: Leoni Kabel GmbH

( * ) Notice: Subject to any disclaimer, the term of this patent is extended or adjusted under 35 U.S.C. 154(b) by 0 days.

(21) Appl. No.: 17/054,715

(22) PCT Filed: Jun. 12, 2019

(86) PCT No.: PCT/DE2019/200062
§ 371 (c)(1),
(2) Date: Nov. 11, 2020

(87) PCT Pub. No.: WO2019/238178
PCT Pub. Date: Dec. 19, 2019

(65) Prior Publication Data
US 2021/0071824 A1    Mar. 11, 2021

(30) Foreign Application Priority Data
Jun. 12, 2018  (DE) ................... 10 2018 113 970.5

(51) Int. Cl.
*F21V 8/00*    (2006.01)
*F21K 9/68*    (2016.01)
(Continued)

(52) U.S. Cl.
CPC ............. *F21K 9/68* (2016.08); *F21V 7/0066* (2013.01); *G02B 6/0005* (2013.01);
(Continued)

(58) Field of Classification Search
None
See application file for complete search history.

(56) References Cited

U.S. PATENT DOCUMENTS

| 5,617,497 A | 4/1997 | Kingstone |
| 6,293,081 B1 * | 9/2001 | Grulick ............... G02B 6/4482 174/112 |

(Continued)

FOREIGN PATENT DOCUMENTS

| DE | 102014110097 | 1/2015 |
| DE | 102017102783 | 8/2018 |

OTHER PUBLICATIONS

International Search Report and Written Opinion for PCT/DE2019/200062, European Patent Office, dated Aug. 5, 2019.
(Continued)

*Primary Examiner* — Elmito Breval
(74) *Attorney, Agent, or Firm* — Williams Mullen; Thomas F. Bergert

(57) ABSTRACT

The present disclosure relates to a cable having a light-emitting element. An exemplary embodiment of the cable has, in addition to the light-emitting element, a cable core comprising at least one cable construction element. The cable also has a reflective layer, which at least partially surrounds the cable core along a tangential direction with respect to a cable axis of the cable and which is designed to reflect light that is emitted by the light-emitting element. The cable also has a sheath, which is designed to conduct the light emitted by the light-emitting element around the cable core substantially in the tangential direction and to couple said light out substantially in the radial direction with respect to the cable axis. The reflectivity of the reflective layer varies in the tangential direction.

13 Claims, 2 Drawing Sheets

Figure 1:
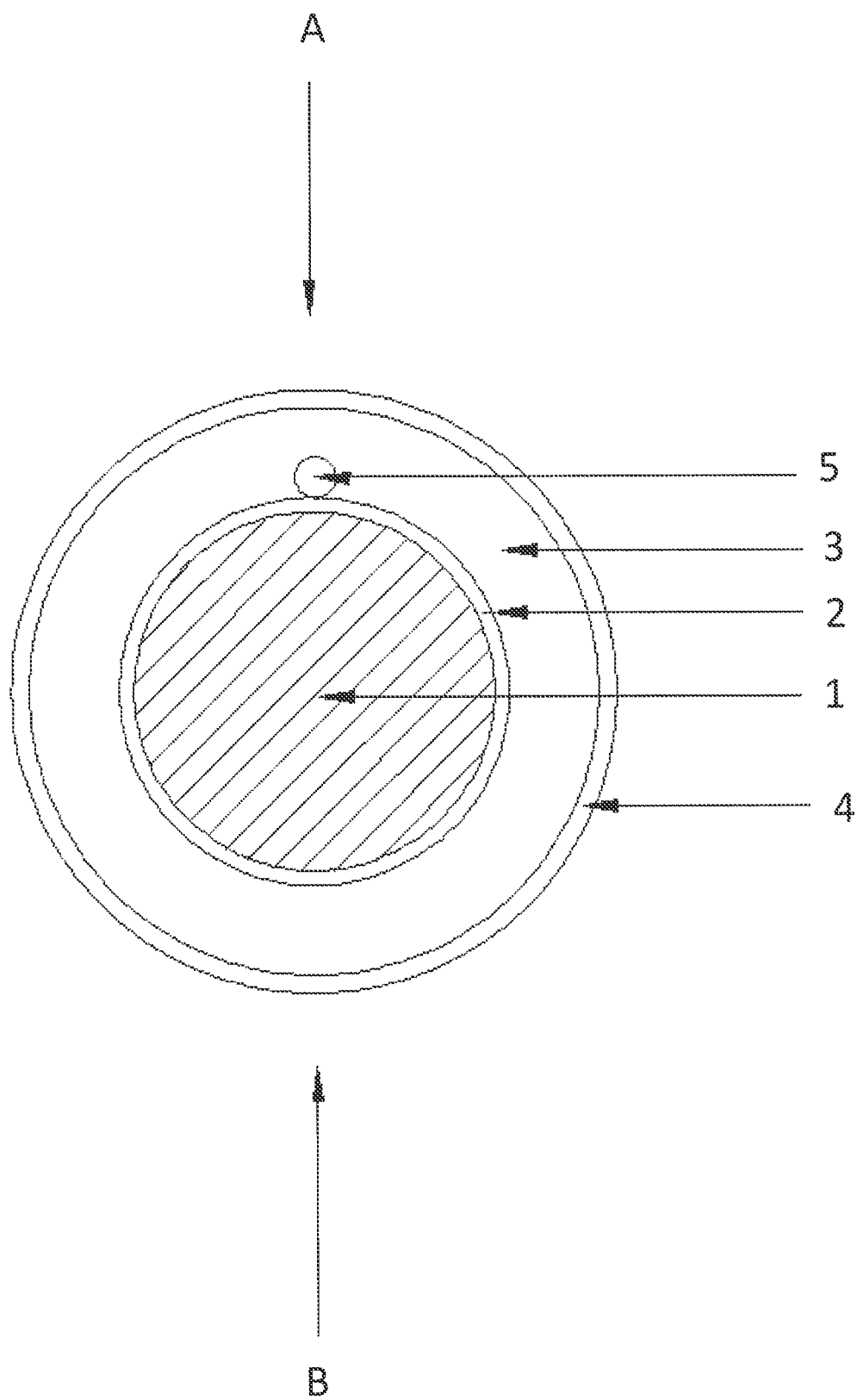

(51) Int. Cl.
*F21V 7/00* (2006.01)
*F21Y 103/10* (2016.01)
*F21Y 115/10* (2016.01)

(52) U.S. Cl.
CPC ....... *F21V 2200/10* (2015.01); *F21Y 2103/10* (2016.08); *F21Y 2115/10* (2016.08)

(56) References Cited

U.S. PATENT DOCUMENTS

| | | |
|---|---|---|
| 2015/0023024 A1 | 1/2015 | Ohta et al. |
| 2015/0043875 A1 | 2/2015 | Bookbinder et al. |
| 2015/0332810 A1 | 11/2015 | Crossland et al. |
| 2015/0373449 A1 | 12/2015 | Jackson |

OTHER PUBLICATIONS

Examination Report for German Application DE 10 2018 113 970.5, German Patent and Trade Mark Office, dated Mar. 27, 2019.

* cited by examiner

CABLE HAVING A LIGHT-EMITTING ELEMENT

CROSS-REFERENCE TO RELATED APPLICATIONS

This application is the U.S. national phase of international application PCT/DE2019/200062, filed on Jun. 12, 2019, which claims the benefit of German application DE 10 2018 113 970.5 filed on Jun. 12, 2018; all of which are hereby incorporated herein in their entirety by reference.

The present disclosure relates to a cable and in particular to a cable having a light-emitting element arranged in the cable.

Cables are used in many different technical applications, such as, for example, for transferring data (in which case the term data cable is also used) or for providing electrical voltage. In particular in the case of a data cable, data transfer can take place electrically (electrical data cable), optically (optical data cable) or by a combination of the two (usually referred to as a hybrid cable, sometimes also a combination cable).

A known cable has for these purposes a cable core, which comprises any desired number of cable structural elements. The cable structural elements can be, for example, an electrical conductor or an optical fiber.

For a number of applications, it can be advantageous to optically represent the technical state of a cable, previously defined transfer parameters or also technical parameters arising directly on transfer by means of a light-emitting element in the cable. The light-emitting element can thereby be arranged in the cable and in particular in the cable sheath.

When light is emitted by the light-emitting element, it is, however, desirable that the perceived light intensity is as homogeneous as possible, that is to say appears as evenly as possible, over the entire circumference of the cable (that is to say along a tangential direction with respect to a cable axis of the cable). A simple solution to this problem consists in providing a number of two or more light-emitting elements distributed (evenly) over the entire circumference of the cable.

However, this solution has the disadvantage that the contacting of the individual light-emitting elements is complicated and expensive. If, for example, optical fibers are used as the light-emitting elements, then the coupling of the individual fibers is complicated. Furthermore, the costs of the cable increase with the number of light-emitting elements.

There is a need for cables having a light-emitting element which permit a desired intensity distribution of the light emission with respect to the circumference of the cable.

For this purpose, a cable is provided. The cable has a cable core comprising at least one cable structural element. The cable further has a light-emitting element and a reflective layer, which surrounds the cable core at least partially along a tangential direction with respect to a cable axis of the cable and which is adapted to reflect light that is emitted by the light-emitting element. The cable further has a sheath, which is adapted to conduct the light emitted by the light-emitting element around the cable core substantially in the tangential direction and to couple it out substantially in the radial direction with respect to the cable axis. A reflectivity of the reflective layer varies in the tangential direction.

As a result of the varying reflectivity of the reflective layer in the tangential direction, it can be ensured that the light emission of the light-emitting element has a desired radiation characteristic along the tangential direction. In particular, the varying reflectivity can be so chosen that an intensity distribution of the emitted light along the tangential direction (that is to say along the circumference of the cable) is as homogeneous as possible.

The cable can be, for example, a data cable or a power cable. The cable structural elements of the cable core can comprise, for example, one or more optical fibers and/or one or more electrical conductors (for example metallic conductors).

The light-emitting element can be, for example, a light guide (in particular an optical fiber), which is adapted to couple light out in radial directions with respect to an axis of extent (longitudinal direction) of the light-emitting element. The light-emitting element can extend, for example, along an entire length of the cable or only along a spatially limited portion with respect to a cable axis of the cable. It is, for example, also possible that the light-emitting element comprises a light guide which has one or more portions along the cable axis along which light is coupled out radially, and one or more portions along the cable axis along which the light conducted by the light guide is only reflected internally (for example by total reflection) and not coupled out radially.

The light-emitting element can comprise a light source, for example a light-emitting diode (LED). The light source can be operated by means of electrical conductors which extend along the cable axis of the cable.

The reflective layer can be adapted to reflect the light that is conducted by the sheath around the cable core back into the sheath. The reflective layer can comprise, for example, a reflective foil or an extruded layer. The reflective foil can be, for example, a metallic foil. The reflective layer can further also be formed of a material which has a lower refractive index than a material of the sheath in a region of the boundary surface of the sheath with the reflective foil. In this case, the light can be reflected (back into the sheath) by the reflective layer by means of total reflection.

When a tangential direction is mentioned hereinbelow, this means a direction that runs along the circumference of the cable and accordingly runs circularly around a cable axis (for example z-axis) of the cable. Furthermore, the sign of the tangential direction is not specified more precisely when a tangential direction is mentioned herein. Accordingly, a tangential direction can be both a positive tangential direction and a negative tangential direction. The positive and negative tangential directions are also referred to herein, for the purpose of precise differentiation, as a "first tangential direction" and a "second tangential direction", respectively, when the concrete sign of the tangential direction is important. A radial direction herein denotes a direction that is perpendicular to the tangential direction and runs radially with respect to the cable axis. A sign of the radial direction is not specified further, unless indicated otherwise.

A cross-section of the cable or cable core is not limited to a circular shape. If, for example, the cable core has an elliptical cross-section or a cross-section with protuberances and/or depressions, then it is clear to the person skilled in the art that a reflective layer which follows this cross-section likewise extends along a tangential direction with respect to the cable axis.

The sheath serves, for example, as a light guide with respect to the tangential direction, wherein light that strikes inner boundary surfaces of the sheath is at least partially reflected there. When it is mentioned herein that light is conducted around the cable core substantially in the tangential direction, this does not mean that all the light beams run tangentially but only that individual light beams are so deflected by the sheath that they also reach regions along a circumference of the cable core that they would not reach if no deflection were to take place. In other words, the shape of the sheath, which functions as a light guide, describes the direction of the deflection of the light. When the sheath extends around the cable core substantially in the tangential direction, then the light is also conducted around the cable core substantially in the tangential direction.

Similarly, coupling out "substantially in the radial direction with respect to the cable axis" does not mean that each individual light beam that is coupled out must run exactly radially. Rather, the light can be scattered on coupling out, so that it runs substantially in the radial direction only inasmuch as it runs away from the cable axis.

The variation of the reflectivity of the reflective layer can be achieved in several different ways. Conventional methods of the art by which a reflectivity of a reflective layer can be changed in a spatially gradual manner are known to the person skilled in the art. For example, the variation of the reflectivity can be achieved by a partial dulling of a shiny metallic foil. Furthermore, a boundary surface at which total reflection takes place can be so manipulated by the provision of individual interference points that light that strikes the interference points is not totally reflected but is scattered or absorbed.

The reflective layer can be arranged between the cable core and the light-emitting element.

In other words, at least a portion of the reflective layer can be arranged between the cable core and the light-emitting element. The reflective layer can contact the light-emitting element directly in this portion. An advantage of this arrangement is, for example, that light that is emitted by the light-emitting element can be reflected in the direction of the sheath directly at the location of the light-emitting element, which increases the light intensity available for coupling out.

The reflective layer can enclose the cable core completely in the tangential direction.

In other words, the reflective layer can extend a full 360° around the cable axis, so that, in cross-section perpendicular to the cable axis, it forms a closed line (in particular, for example, a circle or an ellipse). Accordingly, a radiation characteristic and in particular a homogeneity around the entire circumference of the cable can be established.

The reflectivity of the reflective layer can increase, starting from a point that is arranged closest to the light-emitting element, in the tangential direction along at least a first tangential rotational direction.

Accordingly, it can be ensured that light that has covered a greater distance in the sheath is reflected with a higher reflectivity, so that, for example, scattering losses and absorption losses can be compensated for. The reflectivity can increase continuously, for example. The point that is arranged closest to the light-emitting element can be, for example, a point of the reflective layer that contacts the light-emitting element. The reflectivity of the reflective layer can increase continuously, for example, up to a point at which it reaches a maximum. This point of the maximum can be located, with respect to the cable core, opposite the point that is arranged closest to the light-emitting element. In other words, the two points can be arranged offset by 180° relative to the tangential direction.

The reflectivity of the reflective layer can increase, starting from the point that is arranged closest to the light-emitting element, in the tangential direction along the first tangential rotational direction and along a second tangential rotational direction contrary to the first tangential rotational direction.

In other words, an absolute or local minimum of the reflectivity can be located at the point that is arranged closest to the light-emitting element. The reflectivity can increase in both tangential rotational directions until it reaches a common maximum at a point at which the reflective layer converges again. Accordingly, it can be ensured that light that strikes the reflective layer in the immediate vicinity of the light-emitting element and accordingly has not yet experienced any (or has experienced only slight) intensity losses within the sheath is not reflected outwards to the same extent as light that has already been conducted over a greater distance within the sheath and accordingly has already experienced intensity losses (for example by scattering or absorption). This can lead to the light perceived outside the cable having a homogeneous intensity distribution.

The reflectivity of the reflective layer can have a maximum at a point that is furthest away from the light-emitting element along the first tangential rotational direction or along the second tangential rotational direction.

When the reflective layer encloses the cable core completely, a common (and global) maximum can be located at the point of the maximum at which the reflectivity converges both along the first tangential rotational direction and along the second tangential rotational direction.

The reflectivity of the reflective layer can increase continuously, starting from the point that is arranged closest to the light-emitting element, in the tangential direction up to the maximum, so that an intensity distribution of the out-coupled light outside the cable is substantially homogeneous along the tangential direction.

A profile of the reflectivity that is required therefor can be determined by the person skilled in the art by means of suitable simulation techniques, for example. As a simple approximation, for example, a linear increase on both sides (that is to say in the first and second tangential rotational direction) is conceivable, starting from the point that is arranged closest to the light-emitting element, where there is a minimum of the reflectivity.

The light-emitting element can comprise a light-conducting fiber. Accordingly, the light that is ultimately coupled out from the sheath can be generated by a light source (for example an LED) which is arranged at a first cable end and from which light is coupled into the light-conducting fiber.

The light-emitting element can comprise a chain of light-emitting diodes. The chain of light-emitting diodes thereby extends, for example, along the cable axis. A substantially homogeneous illumination intensity along the cable axis can thus be ensured.

The light-emitting element can be at least partially embedded in the sheath. In other words, the sheath can contact the light-emitting element directly and surround it partially or completely. As a result, it can be ensured that the light-conducting element does not influence a shape of an outer circumference of the sheath and accordingly of the cable (for example a circular shape).

At least one of the following pairs of cable components can be in direct contact with one another: the cable core and the reflective layer, the reflective layer and the light-emitting element, the reflective layer and the sheath, and the light-emitting element and the sheath.

The sheath can comprise a transparent sheath element, which is adapted to conduct the light emitted by the light-emitting element around the cable core substantially in the tangential direction, and a light-scattering sheath element, which is arranged outside the transparent sheath element in the radial direction and which is adapted to couple out the light emitted by the light-emitting element substantially in the radial direction.

Both the transparent sheath element and the light-scattering sheath element can be substantially tubular in form. Furthermore, the light-scattering sheath element and the transparent sheath element can be so arranged coaxially relative to one another that the light-scattering sheath element contacts the transparent sheath element and surrounds it. The transparent sheath element can be a light guide which allows light to be conducted therein substantially along the tangential direction. This can be achieved by reflections at the boundary surfaces of the transparent sheath element, wherein a reflection (inwards) takes place at the reflective layer and a reflection (outwards) takes place at the light-scattering sheath element. The reflections can in each case be partial reflections, which means that the respective reflectivity is not 100%, in particular, the light-scattering sheath element is provided to couple out light outwards (that is to say substantially in the radial direction). Accordingly, light that reaches the boundary surface between the transparent sheath element and the light-scattering sheath element is not reflected completely there but is in part conducted into the light-scattering sheath element (for example by the provision of scattering bodies), where it is coupled (for example by means of scattering bodies) out of the sheath and accordingly out of the cable. Owing to the light-scattering properties of the light-scattering sheath element, this can also be referred to as a white layer and in particular as a white skin layer.

At least one of the following pairs of cable components can be in direct contact with one another: the reflective layer and the transparent sheath element, the light-emitting element and the transparent sheath element, and the transparent sheath element and the light-scattering sheath element.

Figure 2:
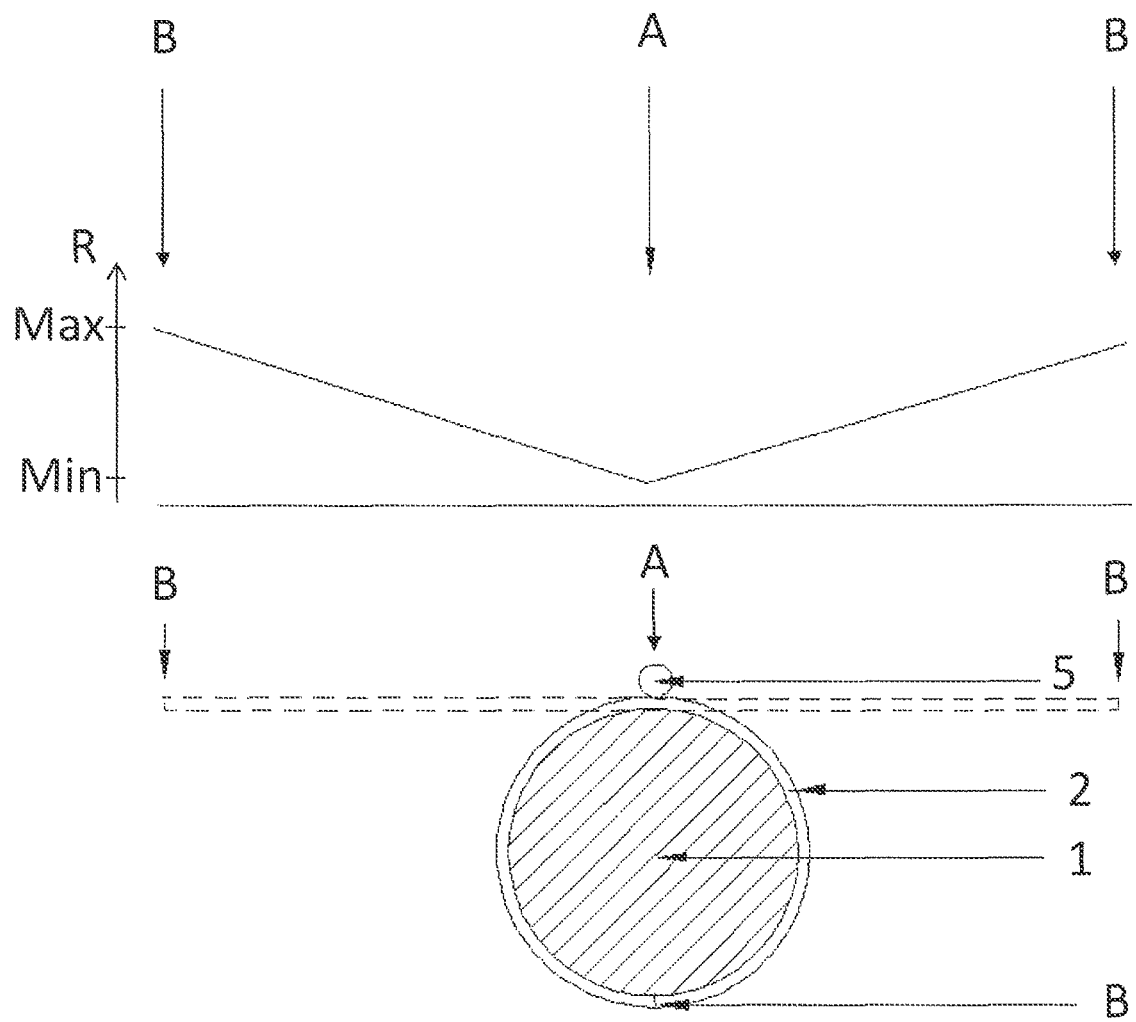

The present disclosure is to be explained further with reference to figures. These figures show, schematically:

FIG. 1 a possible form of a cable in cross-section perpendicular to the cable axis, according to a first embodiment; and FIG. 2 details of a possible profile of the reflectivity of the reflective layer of the cable of the exemplary embodiment.

In the following, without being limited thereto, specific details are presented in order to provide a complete understanding of the present disclosure. It is, however, clear to a person skilled in the art that the present disclosure can be used in other exemplary embodiments which may differ from the details presented hereinbelow. Specific configurations and forms of a cable are described in the following by way of example and are not to be regarded as limiting. Various fields of application of the cable are further conceivable.

FIG. 1 shows a cable according to an exemplary embodiment of the present disclosure in cross-section and, more specifically, in cross-section along a plane (for example x-y plane) which extends perpendicularly to a cable axis (for example z axis) of the cable. The cable axis corresponds to an axis of extent or an axis of symmetry of the substantially cylindrical shape of the cable, and accordingly to a longitudinal direction.

In a middle part of the cable there is a cable core 1, which is substantially circular in cross-section and extends coaxially with the cable axis. The circular shape of the cable core 1 is, however, an idealized representation and the cable core 1 can have any desired shape in cross-section that is suitable for comprising one or more cable structural elements (not shown). The one or more cable structural elements can be, for example, any desired number of electrical and/or optical conductors, optionally with appropriate intermediate insulation and/or shielding.

In direct contact with the cable core 1 is a reflective layer 2, which according to the exemplary embodiment surrounds the cable core 1 completely (that is to say extends along the entire circumference of the cable core 1). However, it is also conceivable that the reflective layer 2 does not surround the cable core 1 completely and that there is, for example, a gap at point A shown in FIG. 1, at which the light-emitting element 5 described hereinbelow is arranged.

The cable core 1 and the reflective layer 2 are surrounded coaxially by a sheath, which is composed of a transparent sheath element 3 and a light-scattering sheath element 4. The light-scattering sheath element 4 can be a light-colored, preferably white, skin layer which (in the radial direction) is thinner than the transparent sheath element 3. The light-scattering sheath element 4 surrounds the transparent sheath element 3 completely and forms an outer layer of the cable.

As is shown in FIG. 1, the cable is constructed from the inside outwards (that is to say in the radial direction, starting from the cable axis) as follows: cable core 1, reflective layer 2, transparent sheath element 3 and light-scattering sheath element 4. The individual elements are thereby arranged coaxially and are in direct contact with one another. However, the present disclosure is not limited to this exemplary embodiment, and further intermediate layers can be provided according to other exemplary embodiments.

At a boundary surface between the reflective layer 2 and the transparent sheath element 3 there is arranged a light-emitting element 5. As is shown in FIG. 1, the light-emitting element can be embedded at least partially in the material of the transparent sheath element 3, so that no undesirable voids are present in the region of the light-emitting element 5. The light-emitting element 5 of the exemplary embodiment is a light-conducting fiber, which is adapted to emit, or couple out, light in radial directions with respect to a fiber axis of the light-emitting element 5 at least at the level of the cross-section shown in FIG. 1. Accordingly, light from the light-emitting element 5 is coupled into the transparent sheath element 3, which serves as a light guide.

The point of the reflective layer 2 at which the light-emitting element 5 is arranged (more precisely, at which a distance from the light-emitting element 5 is the smallest) is referred to in the following as point A (see FIG. 1). At this point A, the light-emitting element 5 is in direct contact with the reflective layer 2. As is shown in FIG. 1, the point of the reflective layer 2 that is at the greatest distance from point A along the reflective layer 2 is referred to as point 13, Point B is located on the opposite side with respect to the cable axis of the cable, or is offset by 180° relative to point A.

As an alternative to the embodiment outlined above, the light-emitting element 5 does not have to be in direct contact with the reflective layer 2. For example, the light-emitting element 5 can be embedded completely in the transparent sheath element 3, so that part of the transparent sheath element 3 is located between the light-emitting element 5 and the reflective layer 2. Alternatively, an opening in the reflective layer 2 can also be provided at point A, so that the reflective layer 2 does not surround the cable core 1 completely. The light-emitting element 5 can thereby be provided in the opening and accordingly not contact the reflective layer 2.

Light that is emitted by the light-emitting element 5 and coupled into the transparent sheath element is conducted by the transparent sheath element, as a light guide, around the cable core 1 in the substantially tangential direction as follows. Part of the light emitted by the light-emitting element 5 first runs linearly through the transparent sheath element 3 and then strikes the boundary surface between the transparent sheath element 3 and the light-scattering sheath element 4. Another part is first reflected at the reflective layer 2 and then conducted to the boundary surface. At that boundary surface, the light is partially reflected back into the transparent sheath element 3 and partially coupled out of the cable by means of scattering bodies in the light-scattering sheath element 4 and accordingly emitted substantially in the radial direction. As an alternative to a clearly defined boundary surface between the transparent sheath element 3 and the light-scattering sheath element 4, the light-scattering sheath element can differ from the transparent sheath element 3 only in that scattering bodies are embedded in the light-scattering sheath element 4. The light that is reflected back into the transparent sheath element 3 then either strikes the boundary surface between the transparent sheath element 3 and the light-scattering sheath element 4 again or strikes the reflective layer 2. When the light strikes the above-mentioned boundary surface, it is partially reflected back into the transparent sheath element 3 again and partially coupled out by the light-scattering sheath element 4. When the light strikes the reflective layer 2, it is reflected at that layer back into the transparent sheath element 3. However, the reflectivity is not constant but varies along the tangential direction, as is described in detail hereinbelow in connection with FIG. 2.

As a result of the continuous reflection between the boundary layer transparent sheath element 3/light-scattering sheath element 4 and the reflective layer 2, the light is conducted by the transparent sheath element 3, as a light guide, around the cable core 1 substantially in the tangential direction.

The reflective layer 2 can be, for example, a metallic foil or a layer of a material whose refractive index is lower than that of the transparent sheath element 3, so that total reflection can take place at the boundary surface transparent sheath element 3/reflective layer 2.

If the reflectivity of the reflective layer 2 were not to be adapted as described in the following, the following problem would occur. The further the distance over which the light is conducted from the light-emitting element 5 through the transparent sheath element 3, the greater the intensity losses of that light. The reasons therefor are, for example, an incomplete transmittance (T<1) of the transparent sheath element 3 as well as losses which are caused by the desired outcoupling of the light by the light-scattering sheath element 4. Furthermore, there are reflection losses at the reflective layer 2, since the reflectivity thereof is less than 1 (R<1) and light is partially absorbed at the reflective layer 2. This would have the consequence that significantly more light is coupled out of the cable in the region of point A than at point B. In other words, a light intensity measured in the direction of the arrow (see FIG. 1) at point A would be significantly higher than that measured in the direction of the arrow (see FIG. 1) at point B. The cable would accordingly have an undesirable inhomogeneous intensity distribution along the circumference of the cable (that is to say along the tangential direction).

In connection with FIG. 2, it is explained in the following how a radiation characteristic of the cable in respect of the tangential direction can be adjusted in a controlled manner and in particular can be so adjusted that it leads to a substantially homogeneous intensity distribution with respect to the tangential direction.

FIG. 2 shows in the bottom region a cross-section of the cable core 1, of the reflective layer 2 and of the light-emitting element 5. This representation corresponds to the representation of the respective elements from FIG. 1. In addition, it is indicated in FIG. 2 at point B that the reflective layer 2 was joined at that point on manufacture of the cable, so that the reflective layer 2 of the finished cable surrounds the cable core 1 completely. The reflective layer 2 can, for example, first be produced from a flat layer on manufacture of the cable and then joined at its ends (corresponding to point B). This flat layer is illustrated in the bottom part of FIG. 2 by broken lines. Point B and point A of the flat layer are likewise marked.

In addition to producing the reflective layer 2 from a flat layer (for example a metallic foil), further methods of production are possible, such as, for example, coating or vapor deposition of the cable core 1, or extrusion.

The reflective layer 2 has a varying reflectivity R along the circumference of the cable core 1, and accordingly along the tangential direction. For better clarity, this varying reflectivity R is plotted along a linear horizontal axis in the upper part of FIG. 2. The horizontal axis thereby extends from point B via point A to point B, that is to say once around the cable core 1. The reflectivity accordingly corresponds to the reflectivity of the flat reflective layer 2 likewise represented linearly (by a broken line), which is wound around the cable core 1 during production of the cable.

The reflectivity R shown in the top part of FIG. 2 can, however, also be applied to all other methods for producing the reflective layer 2. For example, a longitudinal application of the reflective layer 2 with a longitudinal intake or extrusion of the reflective layer 2 are conceivable. With regard to achieving the varying reflectivity R, it is conceivable, for example, to pretreat the reflective layer 2 before it is applied to (or wound around) the cable core 1, for example by partial dulling of a shiny metallic foil. It is also possible to correspondingly treat an already wound or otherwise applied layer 2 in a continuous process (for example to treat it in terms of color).

In the representation of the top part of FIG. 2, a horizontal direction accordingly corresponds to the tangential direction in the finished cable. More precisely, a positive horizontal direction (to the right) corresponds to a first tangential rotational direction (around to the right) and a negative horizontal direction (to the left) corresponds to a second tangential rotational direction (around to the left).

At point A, which is at the smallest distance from the light-emitting element 5, there is a minimum Min of the reflectivity R. Starting from this minimum Min, the reflectivity R increases in both directions, that is to say in both tangential rotational directions, until it reaches a global maximum Max at point B. The increase between the minimum Min and the maximum Max takes place linearly according to the exemplary embodiment. However, any other desired profile which is suitable for influencing the radiation characteristic of the cable as desired and in particular for homogenizing a radiation characteristic along the tangential direction is also possible.

In addition to the above-described layer 2 extending all round, it is also conceivable, for example, in other exemplary embodiments that the reflective layer 2 has a gap at the point at which the light-emitting element 5 is arranged (at the very top in the representation of the bottom part of FIG. 2), since a minimal reflectivity may in any case be desirable at that point.

Furthermore, it is also possible to provide more than one light-emitting element 5. For example, 2 light-emitting elements 5 can be arranged on opposite sides of the cable core 1, wherein the reflectivity of the reflective layer 2 has a minimum at the point of each of the light-emitting elements 5 and has a maximum between those points. This fundamental idea can be extended to any desired number of light-emitting elements 5.

By means of the technique presented herein it is possible to provide a cable having a light-emitting element which has a desired intensity distribution with respect to the tangential direction (that is to say along the circumference of the cable). In particular, the intensity distribution can be homogenized so that a perceived light intensity is identical when the cable is viewed from any direction.

The invention claimed is:

1. A cable comprising:
 a cable core comprising at least one cable structural element;
 a light-emitting element;
 a reflective layer, which surrounds the cable core at least partially along a tangential direction with respect to a cable axis of the cable and which is adapted to reflect light that is emitted by the light-emitting element; and
 a sheath, which is adapted to conduct the light emitted by the light-emitting element around the cable core substantially in the tangential direction and to couple it out substantially in the radial direction with respect to the cable axis,
 wherein a reflectivity of the reflective layer varies in the tangential direction.

2. The cable as claimed in claim 1,
 wherein the reflective layer is arranged between the cable core and the light-emitting element.

3. The cable as claimed in claim 2,
 wherein the reflective layer encloses the cable core completely in the tangential direction.

4. The cable as claimed in claim 1,
 wherein the reflectivity of the reflective layer increases, starting from a point that is arranged closest to the light-emitting element, in the tangential direction along at least a first tangential rotational direction.

5. The cable as claimed in claim 4,
 wherein the reflectivity of the reflective layer increases, starting from the point that is arranged closest to the light-emitting element, in the tangential direction along the first tangential rotational direction and along a second tangential rotational direction contrary to the first tangential rotational direction.

6. The cable as claimed in claim 5,
 wherein the reflectivity of the reflective layer has a maximum at a point that is furthest away from the light-emitting element along the first tangential rotational direction or along the second tangential rotational direction.

7. The cable as claimed in claim 6, wherein
 the reflectivity of the reflective layer increases continuously, starting from the point that is arranged closest to the light-emitting element, in the tangential direction up to the maximum, so that an intensity distribution of the outcoupled light outside the cable is substantially homogeneous along the tangential direction.

8. The cable as claimed in claim 1,
 wherein the light-emitting element comprises a light-conducting fiber.

9. The cable as claimed in claim 1,
 wherein the light-emitting element comprises a chain of light-emitting diodes.

10. The cable as claimed in claim 1,
 wherein the light-emitting element is at least partially embedded in the sheath.

11. The cable as claimed in claim 1,
 wherein at least one of the following pairs of cable components is in direct contact with one another:
 the cable core and the reflective layer;
 the reflective layer and the light-emitting element;
 the reflective layer and the sheath; and
 the light-emitting element and the sheath.

12. The cable as claimed in claim 1,
 wherein the sheath comprises:
 a transparent sheath element, which is adapted to conduct the light emitted by the light-emitting element around the cable core substantially in the tangential direction; and
 a light-scattering sheath element, which is arranged outside the transparent sheath element in the radial direction and which is adapted to couple out the light emitted by the light-emitting element substantially in the radial direction.

13. The cable as claimed in claim 12,
 wherein at least one of the following pairs of cable components is in direct contact with one another:
 the reflective layer and the transparent sheath element;
 the light-emitting element and the transparent sheath element; and
 the transparent sheath element and the light-scattering sheath element.

* * * * *